May 17, 1932.  H. E. COOK ET AL  1,858,883
METHOD OF MAKING LAMINATED STRUCTURES
Filed May 31, 1930
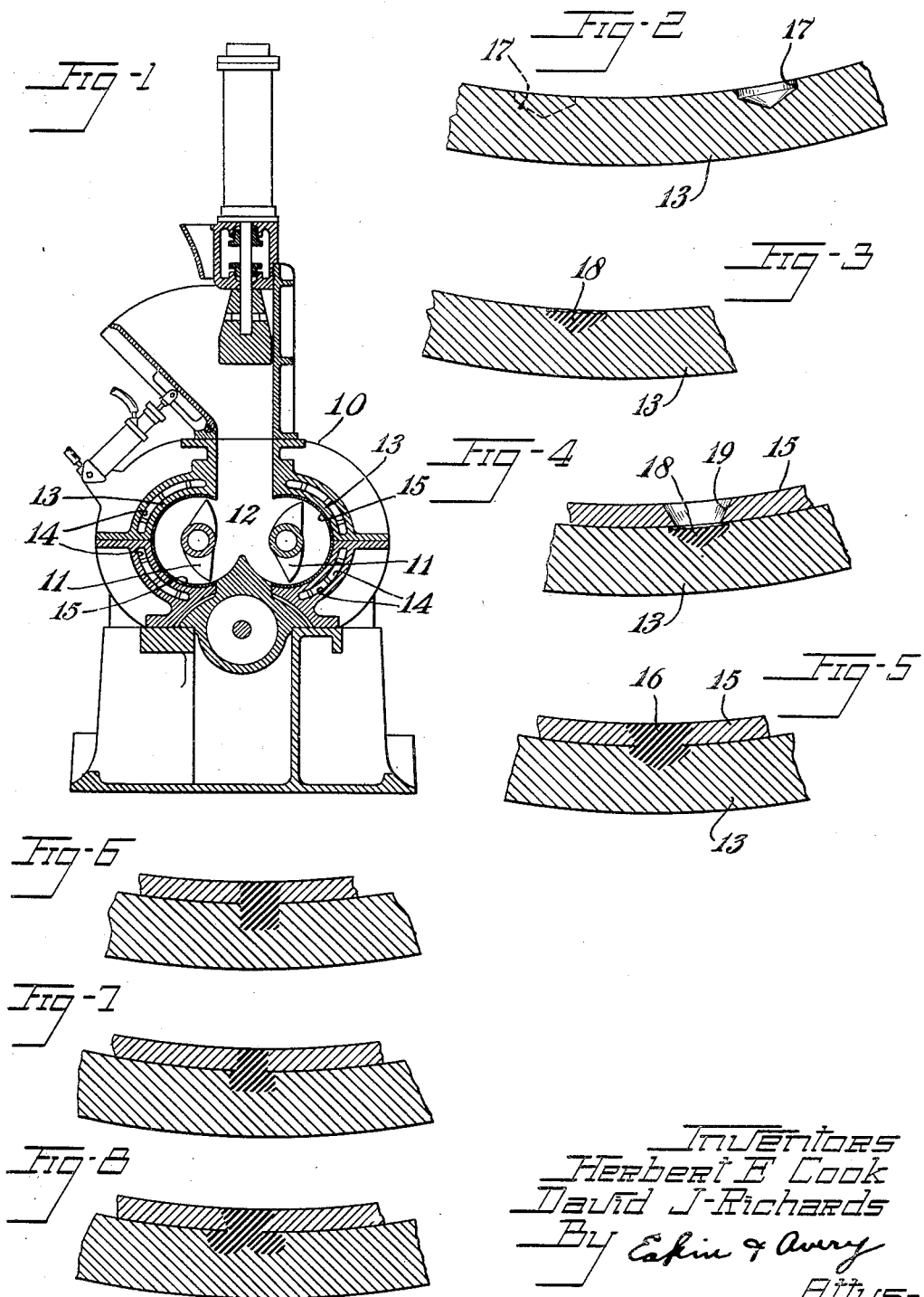
Inventors
Herbert E Cook
David J Richards
By Eakin & Avery
Attys- Patented May 17, 1932

1,858,883

UNITED STATES PATENT OFFICE

HERBERT E. COOK, OF CUYAHOGA FALLS, AND DAVID J. RICHARDS, OF AKRON, OHIO, ASSIGNORS TO THE B. F. GOODRICH COMPANY, OF NEW YORK, N. Y., A CORPORATION OF NEW YORK

METHOD OF MAKING LAMINATED STRUCTURES

Application filed May 31, 1930. Serial No. 458,447.

This invention relates to laminated structures and methods of making the same, and more especially it relates to a laminated metal structure and to methods of uniting the constituent laminæ thereof to produce a unitary structure.

The invention is especially useful for providing a surface of wear-resisting material to machine parts which are subject to being abraded by the material being worked, and where good thermal conductivity is required to permit the heating or cooling of said material. A typical installation is a lining for the mixing chamber of a Banbury mixer, which machine is widely used in the rubber industry for mixing together the various ingredients of a batch of unvulcanized rubber composition. The lining of the chamber of this machine is subject to great torsional strain such as to shear off ordinary rivets, and ordinary face-to-face contact of the lining with the supporting structure does not provide sufficiently good conductivity to effect efficient cooling of the material being worked. Moreover, attempts at uniting a steel lining to the cast iron supporting structure by ordinary welding have resulted in failure when the shrinking metal of the weld pulled away from the cast iron.

The chief objects of the invention are to provide a laminated metal structure approximating the heat conductivity of a solid metal body; to provide for easy replacement of worn parts; to provide a strong union of the parts of a laminated structure to resist torsional shearing strains; to provide a welded bond between two metal members which will not tear loose from the softer metal when contracted during cooling; and to provide an improved and expeditious method of uniting the respective parts of a laminated structure.

Of the accompanying drawings:

Fig. 1 is a vertical section through apparatus embodying our invention in its preferred form.

Figs. 2 is a section through a piece of metal, such as cast iron, illustrating the first step of our method of making a laminated structure.

Fig. 3 is a view similar to Fig. 2 showing the succeeding step of our method.

Fig. 4 is a section through an assembly of cast iron and sheet steel plates depicting the next succeeding step of our improved method.

Fig. 5 is a view similar to Fig. 4 showing the final step of our method.

Figs. 6, 7 and 8 are sections through laminated structures embodying modifications of our invention.

Referring to Fig. 1 of the drawings for an illustrative embodiment of our invention, we show a Banbury mixer 10 having the usual rotary agitators 11, 11 working in a mixing chamber 12, the walls 13, 13 at each side of the latter being formed with passages 14, 14 for cooling fluid, and having respective facings or plates 15 of abrasion-resisting material such as steel, which facings constitute a lining for the mixing chamber 12. The facings 15 are secured to the walls 13 at a multiplicity of relatively closely-spaced points by ties or bonds 16, Fig. 5, which are fused with the metal of the wall-casings 13 and the facing plates 15, being flush with the working surface of the latter. As is clearly shown in Fig. 5, that portion of each tie member 16 which is fused to the plate 15 is tapered toward the juncture of the latter with the wall-casting 13, and terminates in a head of larger size than its smallest diameter, said head being disposed wholly within said wall-casting and fused thereto. The wall-casting 13 and facing plate 15 thus constitue a laminated structure, the laminæ of which are locally united by fusion.

In constructing the laminated structure described, the face of the wall 13 is first planed smooth, and then shallow recesses 17, 17 are bored therein, said recesses preferably being relatively closely spaced in rows, and the recesses of each row being offset or staggered with relation to the recesses of adjacent rows, substantially as shown in Fig. 2. The recesses 17 are then filled with metal, preferably steel prepared especially for welding purposes, by electric arc welding which fuses the welding steel to the cast iron of the wall 13, the structure, which is allowed to cool, then presenting the appearance shown in Fig. 3 wherein the welding steel is designated 18. Any of the latter projecting above the surface of the wall 13 is removed before commencing the succeeding operation.

The division of the welding operation into two steps results in a division of heat necessary to perform the operation. This allows the heat of bonding and filling the recesses in the first layer to be entirely dissipated by radiation or conduction before the second layer is placed thereon. The second layer, being of material more readily weldable, may therefore be bonded to the previously deposited metal with application of less heat and consequently with less general expansion of the metal parts.

It also enables the workman to heat the recesses in the cast iron to a sufficient temperature to enable him to puddle the steel into the cast iron and obtain a satisfactory bond. Furthermore it provides more working room and allows the workman to fill larger recesses having a greater surface-contact with the iron without trapping of oxidized material or slag.

The facing plate 15 is transversely arcuate to conform to the shape of the wall 13 of the mixing chamber 12, and is drilled with a multiplicity of apertures 19, 19 which are countersunk or tapered from the concave surface of the facing plate toward its convex surface, the small diameter of each aperture 19, on the convex side of the plate, being smaller than the diameters of the recesses 17 in the wall 13. The apertures 19 are so arranged in the plates 15 as to register with the filled recesses 17 in the walls 13 when the facing plates 15 are assembled thereupon, as is clearly shown in Fig. 4. With the members 13, 15 mounted in the juxtaposed position shown, the final step of our method consists in filling the respective apertures 19 with welding metal, which metal fuses with the metal of the plate 15, and with the welding metal 18 in the recesses 17 of the wall casting 13, thus producing the bonds or ties 16 which are integral with said wall structure and facing plate. The concave surface of the facing plate 15 subsequently is planed to remove any welding metal extending above the surface thereof.

The tapered shape of the apertures 19 provides an interlock of the plate 15 and the ties or bonds 16, and because the recesses 17 in the wall casting are of greater diameter than the small diameter of the apertures 19, said ties are provided with relatively large heads which effectively prevent the tearing away of the welding metal from the wall casting due to contraction while cooling. Thus, the effect of such contraction is to draw the facing plate into strong face-to-face contact with the wall casting to assure good thermal conductivity of the laminated structure, and said conductivity is further improved by the unitary character of the structure at each of the ties 16.

The practice of our improved method effects economies of time, labor, and cost, and our improved laminated structure possesses the other advantages set forth in the foregoing statement of objects.

The modifications shown in Figs. 6, 7, and 8 differ from the preferred embodiment of our invention solely by the shape of weldmetal ties. They are constructed according to our preferred method, and possess advantages present in our preferred structure.

Other modifications are possible within the scope of the appended claims, as we do not limit our claims wholly to the specific construction shown or the exact procedure described.

We claim:
1. The method of making laminated structures which comprises fusing welding metal to one member, cooling said member, superimposing another member upon said first member in intimate contact therewith, and then fusing welding metal to the welding metal previously applied and to the superposed member.

2. The method of making laminated structures which comprises forming a recess in a cast iron member, filling said recess with welding metal by fusing the latter thereto, cooling said member, superimposing a readily weldable metal member upon said first member in intimate contacting relation thereto, and then fusing welding metal to the welding metal previously applied and to the superposed member.

3. The method of making laminated structures which comprises fusing welding cast metal to a metal member at local points thereon, cooling said member forming apertures in a second metal member, superimposing the second metal member upon the first member in intimate contacting relation thereto with the said apertures in registry with the welding metal fused thereto, and then fusing welding metal to that previously applied and to the superposed member.

4. The method of attaching a readily weldable metal facing to the surface of an iron casting, said method comprising forming cavities in the surface of the casting, filling said cavities with molten metal and bonding the deposited metal to the casting, cooling the casting, removing protruding deposited metal, providing openings through the metal facing, superimposing the facing on the casting in intimate contact therewith with its openings aligned with the deposited metal, filling said openings with molten metal, and bonding said molten metal to the previously deposited metal.

In witness whereof we have hereunto set our hands this 28th day of May, 1930.

HERBERT E. COOK.
DAVID J. RICHARDS.